(12) United States Patent
Rodriguez et al.

(10) Patent No.: US 11,058,977 B2
(45) Date of Patent: *Jul. 13, 2021

(54) 3D PRINTED STAGED FILTRATION MEDIA PACKS

(71) Applicant: Caterpillar Inc., Deerfield, IL (US)

(72) Inventors: Javier A. Rodriguez, Peoria, IL (US); Darrell Lee Morehouse, III, Dunlap, IL (US); Philip Carl Spengler, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/042,176

(22) Filed: Jul. 23, 2018

(65) Prior Publication Data

US 2020/0023300 A1 Jan. 23, 2020

(51) Int. Cl.
*B01D 39/16* (2006.01)
*B01D 29/01* (2006.01)
(Continued)

(52) U.S. Cl.
CPC ....... *B01D 39/1692* (2013.01); *B01D 29/016* (2013.01); *B01D 29/56* (2013.01);
(Continued)

(58) Field of Classification Search
CPC ...... B01D 27/00; B01D 27/005; B01D 27/04; B01D 27/08; B01D 27/06; B01D 27/14; B01D 27/146; B01D 27/148; B01D 29/00; B01D 29/0002; B01D 29/0004; B01D 29/0018; B01D 29/0022; B01D 29/0093; B01D 29/0095; B01D 29/01; B01D 29/012; B01D 29/016; B01D 29/03; B01D 29/031; B01D 29/05; B01D 29/07; B01D 29/44; B01D 29/46; B01D 29/50; B01D 29/56; B01D 35/00; B01D 35/005; B01D 35/30; B01D 35/301; B01D 46/00; B01D 46/0001; B01D 46/0002; B01D 46/0004; B01D 46/0005; B01D 46/0012; B01D 46/0016; B01D 46/0019; B01D 46/0039; B01D 46/0041; B01D 46/0047; B01D 46/0049; B01D 46/005; B01D 46/40; B01D 46/406; B01D 46/52; B01D 46/521; B01D 46/528; B01D 46/54; B01D 46/543; B01D 46/546; B01D 2201/00; B01D 2201/18;
(Continued)

(56) References Cited

U.S. PATENT DOCUMENTS 4,395,269 A * 7/1983 Schuler .............. B01D 46/0005
55/302
8,021,455 B2 * 9/2011 Adamek .............. B01D 39/163
55/486
(Continued)

FOREIGN PATENT DOCUMENTS

DE 102013014688 A1 3/2015
EP 0607809 B1 7/1997
(Continued)

*Primary Examiner* — Clare M Perrin
(74) *Attorney, Agent, or Firm* — Law Office of Kurt J. Fugman LLC

(57) ABSTRACT

A filter medium includes a plurality of layers each including an undulating strip of solidified material.

13 Claims, 16 Drawing Sheets

(51) Int. Cl.
  *B01D 46/00* (2006.01)
  *B01D 29/58* (2006.01)
  *B01D 29/56* (2006.01)
  *B01D 35/00* (2006.01)
  B01D 29/11 (2006.01)
  B33Y 10/00 (2015.01)
  B33Y 50/00 (2015.01)
  B33Y 80/00 (2015.01)
  B01D 46/40 (2006.01)

(52) U.S. Cl.
  CPC .......... *B01D 29/58* (2013.01); *B01D 35/005* (2013.01); *B01D 39/16* (2013.01); *B01D 46/0002* (2013.01); *B01D 29/012* (2013.01); *B01D 29/111* (2013.01); *B01D 2239/1216* (2013.01); *B33Y 10/00* (2014.12); *B33Y 50/00* (2014.12); *B33Y 80/00* (2014.12)

(58) Field of Classification Search
  CPC .......... B01D 2201/29; B01D 2201/30; B01D 2201/301; B01D 2201/307; B01D 2201/31; B01D 2267/00; B01D 2267/30; B01D 2267/60; B01D 2267/70; B01D 2275/00; B01D 2275/10; B01D 2275/20; B01D 2275/205; B01D 2275/206; B01D 2313/00; B01D 2313/08; B01D 2313/086; B01D 2313/20; B01D 2319/00; B01D 2319/02; B01D 2201/302; B01D 25/00; B01D 25/001; B01D 25/04; B01D 25/08; B01D 39/00; B01D 39/10; B01D 39/12; B01D 39/14; B01D 39/16; B01D 39/1692; B01D 63/00; B01D 63/08; B01D 63/081; B01D 63/082; B01D 67/00; B01D 67/0002; B01D 67/0004; B01D 67/002; B01D 67/0037; B01D 67/0006; B01D 67/0081; B01D 67/00088; B01D 69/00; B01D 69/06; B01D 69/10; B01D 69/12; B01D 69/122; B01D 69/125; B01D 71/00; B01D 2201/182; B01D 2325/02; B01D 2325/08; B02D 2265/00; B02D 2265/02; B02D 2265/06
  USPC .... 210/232, 249, 252, 255, 258, 262, 321.6, 210/321.72, 348, 416.1; 95/273, 285, 95/286, 287, 291, 43, 45, 52, 54, 55
  See application file for complete search history.

(56) References Cited

U.S. PATENT DOCUMENTS

| | | | |
|---|---|---|---|
| 8,147,693 B2 | 4/2012 | Terry et al. | |
| 8,714,722 B2 | 5/2014 | Hays et al. | |
| 9,023,456 B2 | 5/2015 | Flansburg | |
| 9,890,091 B2 | 2/2018 | Jones | |
| 2002/0027101 A1* | 3/2002 | Insley | B01D 39/1692 210/488 |
| 2015/0014241 A1 | 1/2015 | Wyhler | |
| 2016/0038866 A1 | 2/2016 | Gibson et al. | |
| 2016/0278605 A1 | 9/2016 | Miller et al. | |
| 2016/0287048 A1 | 10/2016 | Thiyagarajan | |
| 2018/0001236 A1 | 1/2018 | Marchione et al. | |
| 2018/0280855 A1* | 10/2018 | Sasaki | A61B 90/00 |

FOREIGN PATENT DOCUMENTS

| | | | |
|---|---|---|---|
| EP | 3209405 B1 | 12/2018 | |
| JP | 2001162110 A | 6/2001 | |
| WO | 2014174323 A1 | 10/2014 | |
| WO | 2016070904 A1 | 5/2016 | |
| WO | 2016189291 A1 | 12/2016 | |
| WO | WO-2016189291 A1 * | 12/2016 | .......... B01J 20/3483 |
| WO | 2017015489 A1 | 1/2017 | |

* cited by examiner

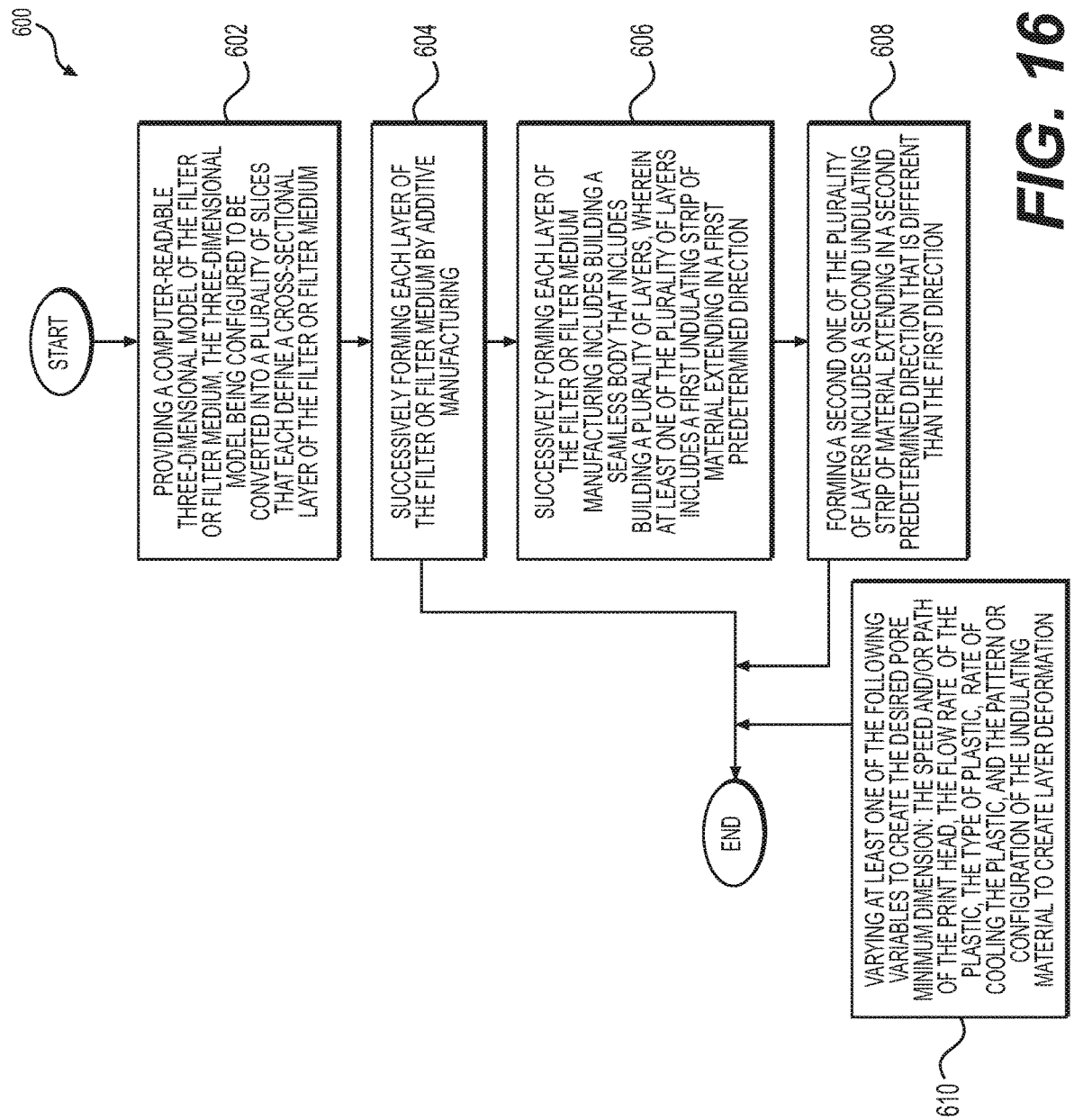

3D PRINTED STAGED FILTRATION MEDIA PACKS

TECHNICAL FIELD

The present disclosure relates to filters and breathers used to remove contaminants various fluids such as hydraulic fluid, air filtration, oil, and fuel, etc. used to power the mechanisms and engines of earth moving, construction and mining equipment and the like (e.g. automotive, agriculture, HVAC (heating, ventilation and air conditioning), locomotive, marine, exhaust treatment or any other industry where filters and breathers are useful). Specifically, the present disclosure relates to filters that are manufactured using 3D printing technology, allowing more complex geometry to be used in the filter.

BACKGROUND

Earth moving, construction and mining equipment and the like often use filters and/or breathers used to remove contaminants various fluids such as hydraulic fluid, oil, and fuel, etc. used to power the mechanisms and engines of the equipment. Over time, contaminants collect in the fluid that may be detrimental to the components of the various mechanisms (e.g. hydraulic cylinders) and the engines, necessitating repair. The goal of the filters and/or breathers to remove the contaminants in the various fluids to prolong the useful life of these components. Any industry using filters and/or breathers may also need to remove contaminants from hydraulic fluid, air, oil, and fuel, etc. Examples of these other industries, include but are not limited to, automotive, agriculture, HVAC, locomotive, marine, exhaust treatment, etc.

The features and geometry employed by such filters is limited by the manufacturing techniques available to make the filters and their associated filter media. The technologies typically used include folding porous fabric or other materials that remove the contaminants. Typical additive manufacture is structured around creating parts which are solid as opposed to being porous. As a result, generating a filtration media of a useable grade that can be integrated into printed parts or used in a media pack is not within the standard capability of current additive technologies such as FDM (fused deposition modeling), FFF (fused filament fabrication), SLA (stereolithography), etc.

For example, U.S. Pat. Application Publication No. 2016/0287048 A1 to Thiyagarajan et al. discloses a filter for a dishwasher appliance that includes a filter medium, a body extending along an axial direction of the filter, and a cap positioned at a first end of the body along the axial direction of the filter. The filter medium is configured to filter debris and other particles from wash fluid from the wash chamber of the dishwasher appliance and is attached to or formed integrally with the body of the filter. Additionally, the cap is configured to allow a flow of wash liquid from the wash chamber of the dishwasher appliance to the filter medium and may be formed integrally with the body of the filter using an additive manufacturing process. FIGS. 15 and 16 and paragraph 59 of Thiyagarajan et al. indicate that the filter openings are macroscopic (0.08 of an inch). This is not suitable to remove some of the contaminants encountered by filters and/or breathers used in earth moving, construction and mining industries and the like (see above for a more expansive list of industries that use filters and/or breathers).

Similarly, U.S. Pat. Application Publication No. 2016/0287605 A1 to Miller et al. discloses a dishwasher appliance that includes a sump assembly with a unitary filter for filtering wash fluid supplied to a wash chamber of the dishwasher appliance. The unitary filter defines a central axis. The unitary filter also has a filter medium with an inner surface that defines an interior chamber of the filter medium. A cross-sectional area of the interior chamber in a plane that is perpendicular to the central axis changes along a length of the central axis. A related method for forming a unitary filter for a dishwasher appliance is also provided. In paragraph 33 of Miller et al., the pore size of the filter medium is said to range from 0.003 of an inch to 0.025 of an inch. However, the exact method of creating such a small pore size is not described in enabling detail.

SUMMARY

A filter medium according to an embodiment of the present disclosure comprises a plurality of layers of solidified material including a first layer with a first undulating strip of solidified material extending in a first predetermined direction, and a second layer with a second undulating strip of solidified material extending in a second predetermined direction. The first layer is in contact with the second layer and the first predetermined direction is not parallel with the second predetermined direction, forming a plurality of pores therebetween.

A filter medium according to another embodiment of the present disclosure comprises a plurality of layers each including an undulating strip of solidified material.

A filter according to an embodiment of the present disclosure comprises a body including an outer wall defining a hollow interior, an inlet in fluid communication with the hollow interior, an outlet in fluid communication with the hollow interior, and a first filter medium disposed in the hollow interior comprising a plurality of layers. Each layer includes an undulating strip of solidified material, forming a plurality of pores between each of the plurality of layers.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 16 is a flowchart illustrating a method of creating a filter and/or a filter medium according to an embodiment of the present disclosure.

DETAILED DESCRIPTION

Figure 1:
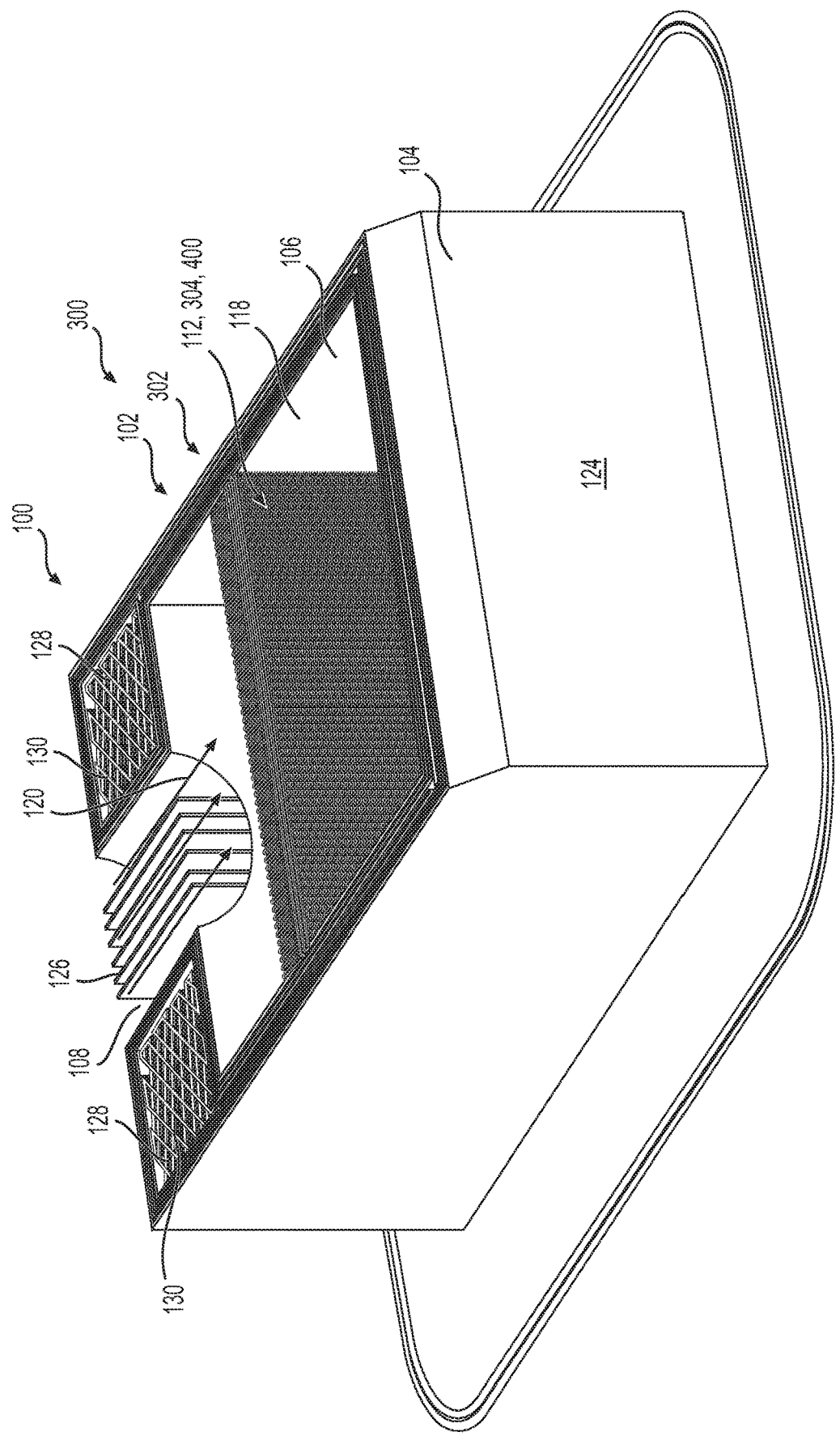
FIG. 1 is a perspective view of a filter with a filter medium manufactured using 3D printing or other additive manufacturing technology according to a first embodiment of the present disclosure. The top portion of the filter is removed to show the inner workings of the filter. More specifically, the filter is shown being as it is being built via an additive manufacturing process.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a filter and/or filter medium will be discussed herein that utilize existing additive manufacturing technologies to implement a method to produce a repeatable process that generates porous filtration media of a useable efficiency grade. Examples of the process include FFF, FDM, SLA, etc., 3D printing hardware, and specific control of the movement patterns of the printing head so that as the material is added to the part, small gaps are created to build a porous structure. This method utilize an open source software that generates the filtration structure based on the inputs given to it by the user. The method may vary the speed and path of the print head, the flow rate of the plastic being deposited, cooling methods, etc. The structure that is laid down may droop or otherwise deform so that small sized pores are created.

For example, the material may drip from one layer to the next layer, creating a seal with the next layer. Thus creating two (or more) pores and finer porosity in the media. Deformation (e.g. dripping, drooping, etc.) may occur from the heat retained from the hot nozzle in the newest created layer and gravity. As a result, the previous laid layer may be attached to the new layer. The dripping layer that is perpendicular/not parallel to two parallel layers separated by a suitable distance may deform until it contacts the adjacent layer, creating two (or more) smaller pores on each side. In effect, this may create finer pore sizes for finer filtration. The desirable deformation may include adjusting the temperature control, control of layer height, extrusion width, infill pattern, etc.

A single layer of filtration media's debris holding capacity is typically limited by the number of flow passages through the media. As fluid passes through the media, debris larger than the passages will not be able to flow through the media and ultimately block the flow passage or become lodged in the media. To increase the capacity of a filter, media can also be layered and/or staggered so that larger debris can be stopped at a different depth than smaller debris. This results in an increase in media debris holding capacity. The prototypical media has a homogenous pore structure. This limits the capacity of the media because most of the debris stopped by the filter will happen near the surface which the contaminated fluid initially flows through.

In various embodiments of the filter media disclosed herein, a gradient within a stage of media and/or several staged media packs fabricated through additive manufacturing techniques may be provided. The media pack can consist of discrete media packs developed and synthesized from unique combinations of input settings in the additive manufacturing process. These settings selectively control the geometry of each stage in the media pack. Fabricating discrete and unique media packs in stages allows for the entire media pack to act as one continuous filtering element despite allowing for multiple stages of filtration as would be done using a filter in filter configuration or having multiple filters in series in a system. Unlike a filter in conventional filter design, adding additional stages does not necessarily result in a significant increase in part complexity and cost.

As a result, the contaminated flow will pass through each stage undergoing a different form of filtration to achieve a certain efficiency level. Ins some embodiments, the height of a layer is held constant with respect to that layer and is defined at a fixed distance from the layer that was just added to the part (printing at different layer heights at different heights of a printed part is something that is done to reduce print time.)

In some embodiments, a method varies the height of the layer as it is printed to create a single layer which is thicker in one area and thinner in another. The change in layer height with respect to depth in the media pack may result in a taper which creates a smaller pore size as the flow progresses downstream. This may increase the efficiency with respect to depth and prevents larger particles from passing further than an appropriate depth specific to that particle size. This may allow for better utilization of the volume occupied by the media pack and may increase the debris holding capacity. The tapers can also be nested, to further increase utilization of the media pack volume. The tapers which are nested, can either be the same dimensions so that it can function as a filter, or the tapers can have progressively smaller specifications that can increase the efficiency with respect to the stage within the media pack.

Filters and/or filter media discussed herein may be used to remove contaminants in any type of fluid, including hydraulic fluid, oil, fuel, etc. and may be used in any industry including earth moving, construction and mining, etc. As used herein, the term "filter" is to be interpreted to include "breathers" or any device used to remove contaminants from fluids as described anywhere herein. Also, any suitable industry as previously described herein that uses filters and/or breathers may use any of the embodiments discussed herein.

Focusing on FIGS. 1 thru 4, a filter according to an embodiment of the present disclosure will be described. It should be noted that the top portion of the filter in FIGS. 1 thru 4 has been removed to show the inner workings of the filter. Even though the top portion is removed, it is to be understood that that the filter would include such a top portion and would form an enclosure in practice. Other components of the filter not specifically shown but is understood to be present include end caps, a center tube, a top plate, etc. The center tube may be omitted in some embodiments because the filter may have more structural integrity since the filter may be manufactured with the filter media.

Figure 6:
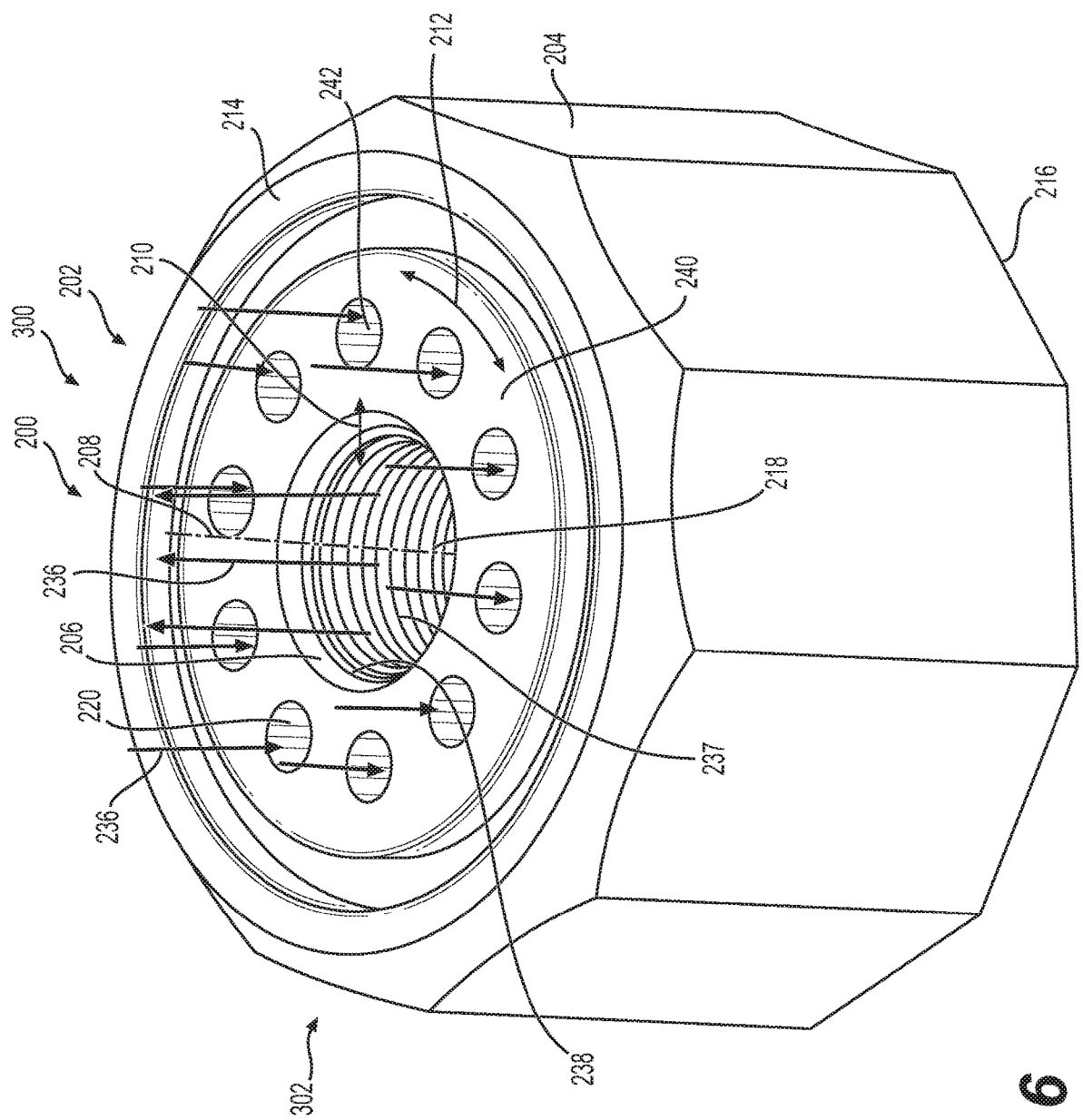
FIG. 6 is a filter assembly according to a third embodiment of the present disclosure.

The filter 100 may comprise a body 102 including an outer wall 104 defining a hollow interior 106. As shown, the outer wall 104 has a rectangular shape (or other polygonal shape). This may not be the case in other embodiments. For example, see FIG. 6. Other configurations such as cylindrical are possible for the outer wall 104. Referring again to FIGS. 1 thru 4, an inlet 108 is in fluid communication with the hollow interior 106. Also, an outlet 110 is in fluid communication with the hollow interior 106. A first filter medium 112 is disposed in the hollow interior 106 comprising a plurality of layers 114, 114', etc. As best seen in FIG. 3, each layer 114, 114', etc. includes an undulating strip 116 of solidified material, forming a plurality of pores 117, 117', etc. between each of the plurality of layers 114, 114'.

Figure 2:
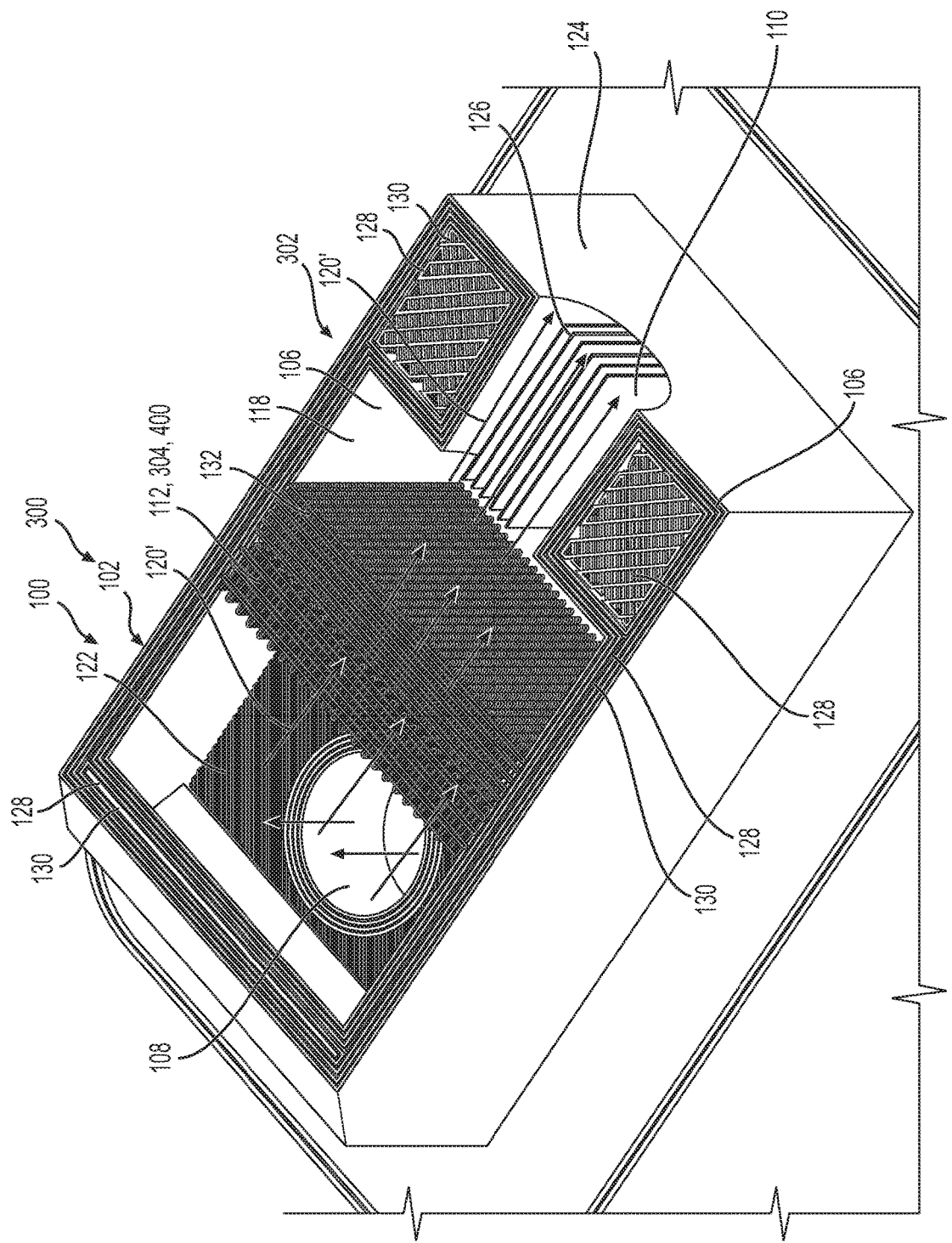
FIG. 2 is a is a perspective view of a filter with filter media manufactured using 3D printing or other additive manufacturing technology according to a second embodiment of the present disclosure, similar to that of FIG. 1 except that a plurality of filter media are provided having different sized pores.
Figure 3:
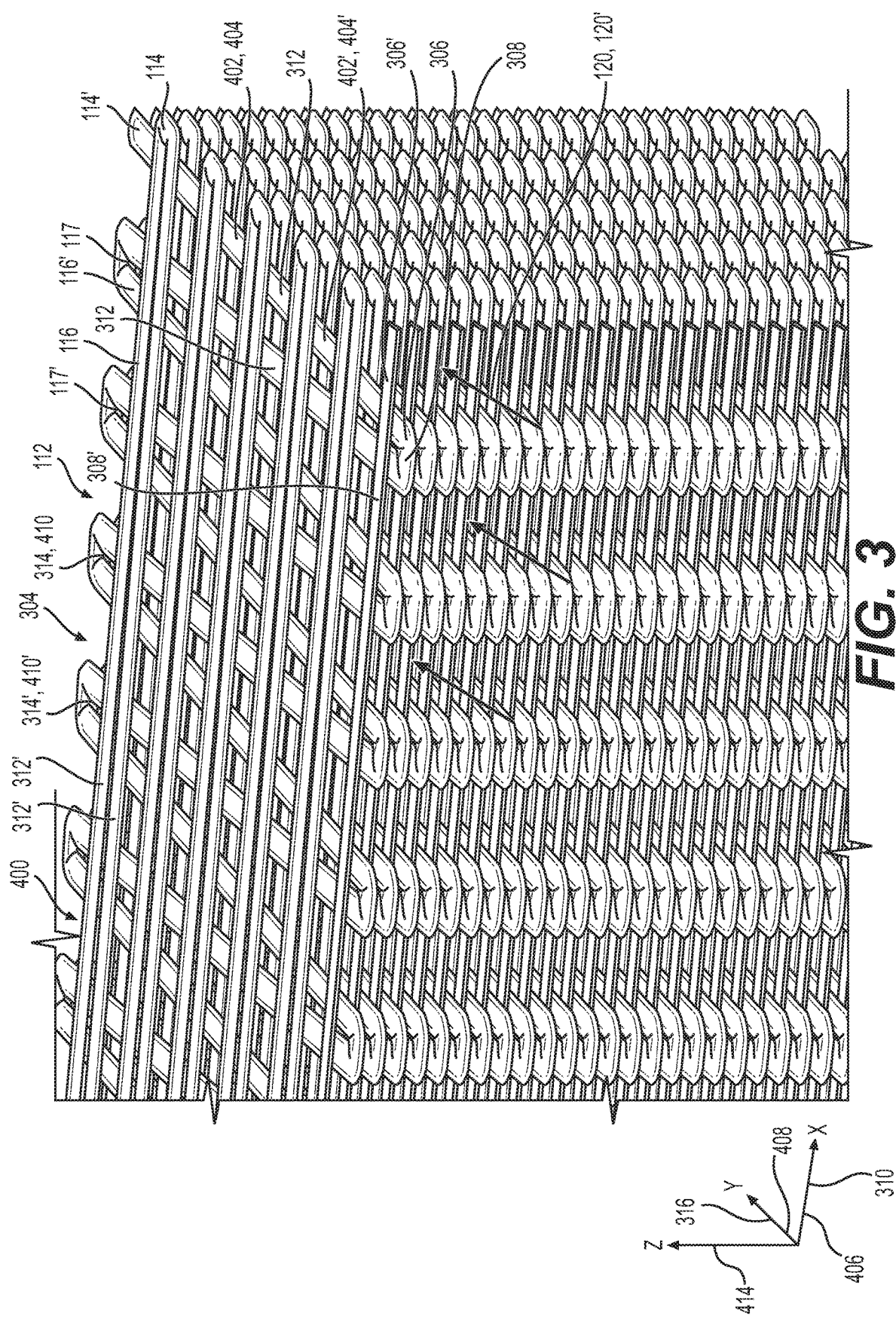
FIG. 3 is an enlarged perspective view of the filter medium of FIG. 1, illustrating that the filter medium is formed by forming layers of undulating strips of material that undulate in an alternating direction from one layer (X direction) to the adjacent layer (Y direction) along the Z direction.
Figure 4:
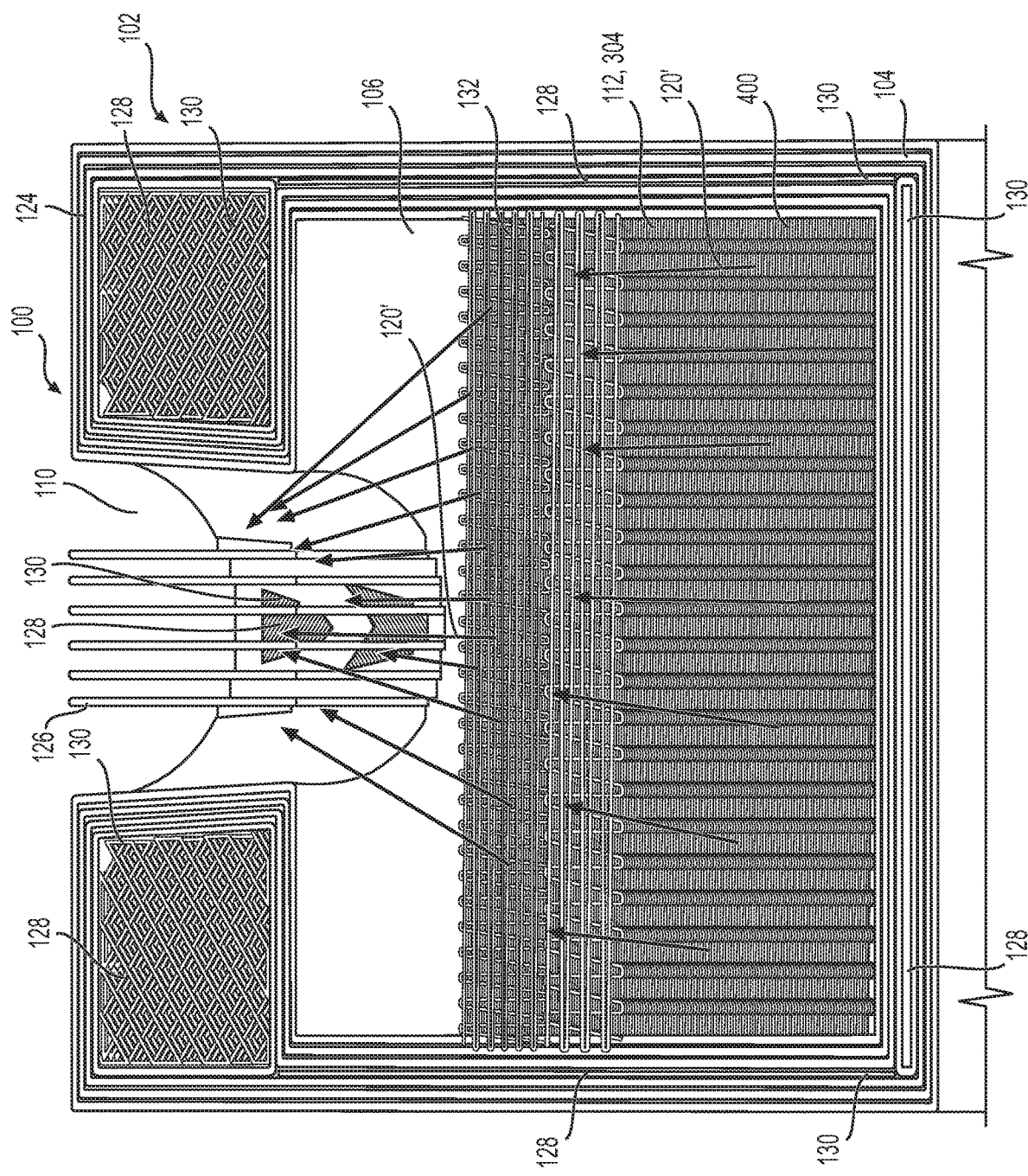
FIG. 4 is a rear oriented perspective view of the filter of FIG. 2.
Figure 7:
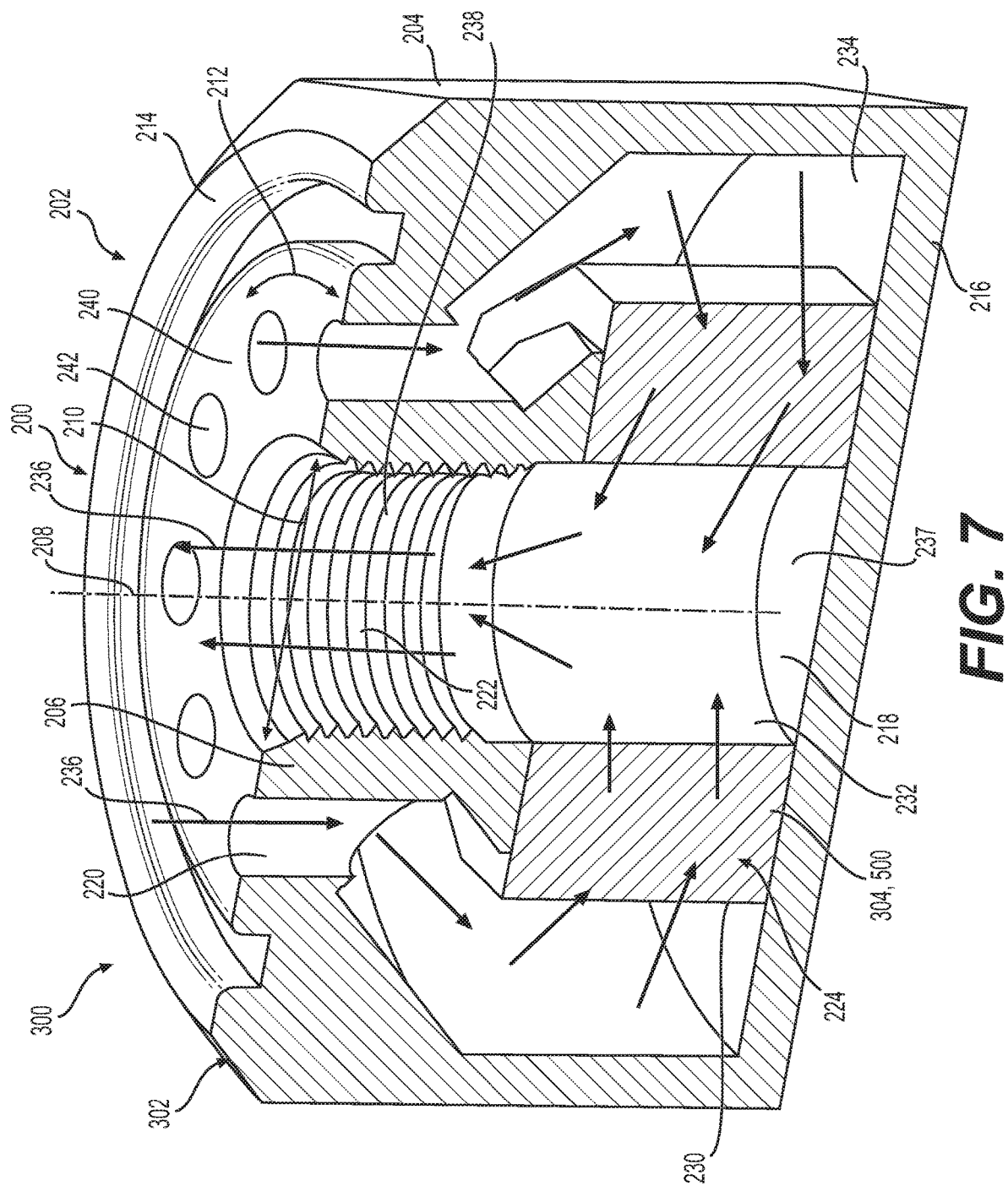
FIG. 7 is a perspective sectional view of the filter assembly of FIG. 6, showing a filtration medium according to yet another embodiment of the present disclosure, depicting the fluid flow through the filter.

Looking at FIGS. 1, 2 and 4, the hollow interior 106 includes a rectangular cubic chamber 118 in fluid communication with the inlet 108 and the outlet 110. The first filter medium 112 is disposed in the rectangular cubic chamber 118 between the inlet 108 and the outlet 110. Consequently, fluid that is to be filtered enters through the inlet 108, passes through the first filter medium 112, and out the outlet 110. It should be noted that the inlet 108 and outlet 110 can be switched as illustrated by the contrasting fluid flow arrows 120 in FIG. 1 versus the fluid flow arrows 120' in FIG. 2. The hollow interior 106 may have other shapes other than rectangular cubic such as shown in FIG. 7.

Referring to FIG. 2, the body 102 may include a bottom wall 122 and a sidewall 124. The inlet 108 may extend through the bottom wall 122 and the outlet 110 may extend through the sidewall 124. In FIGS. 1, 2 and 4, the body 102 defines a plurality of parallel support ribs 126 disposed in the outlet 110 or inlet 108 that extends through the sidewall 124. The function of these support ribs 126 is to support the structure of the body 102 as it is being built via an additive manufacturing process, while being able to allow fluid flow through the orifice (e.g. inlet 108 or outlet 110) in the sidewall 124 with little resistance. That is to say, the ribs 126 are oriented in the desired flow direction 120, 120'.

Similarly, the body 102 further defines a plurality of auxiliary voids 128 that are not in fluid communication with the rectangular cubic chamber 118. The body 102 includes support structure 130 disposed in the plurality of auxiliary voids 128. The purpose of the auxiliary voids 128 is to speed up the manufacturing process when being built via an additive manufacturing process while the support structure 130, which may take the form of a lattice of interconnecting ribs, provides for structural rigidity and strength.

Figure 5:
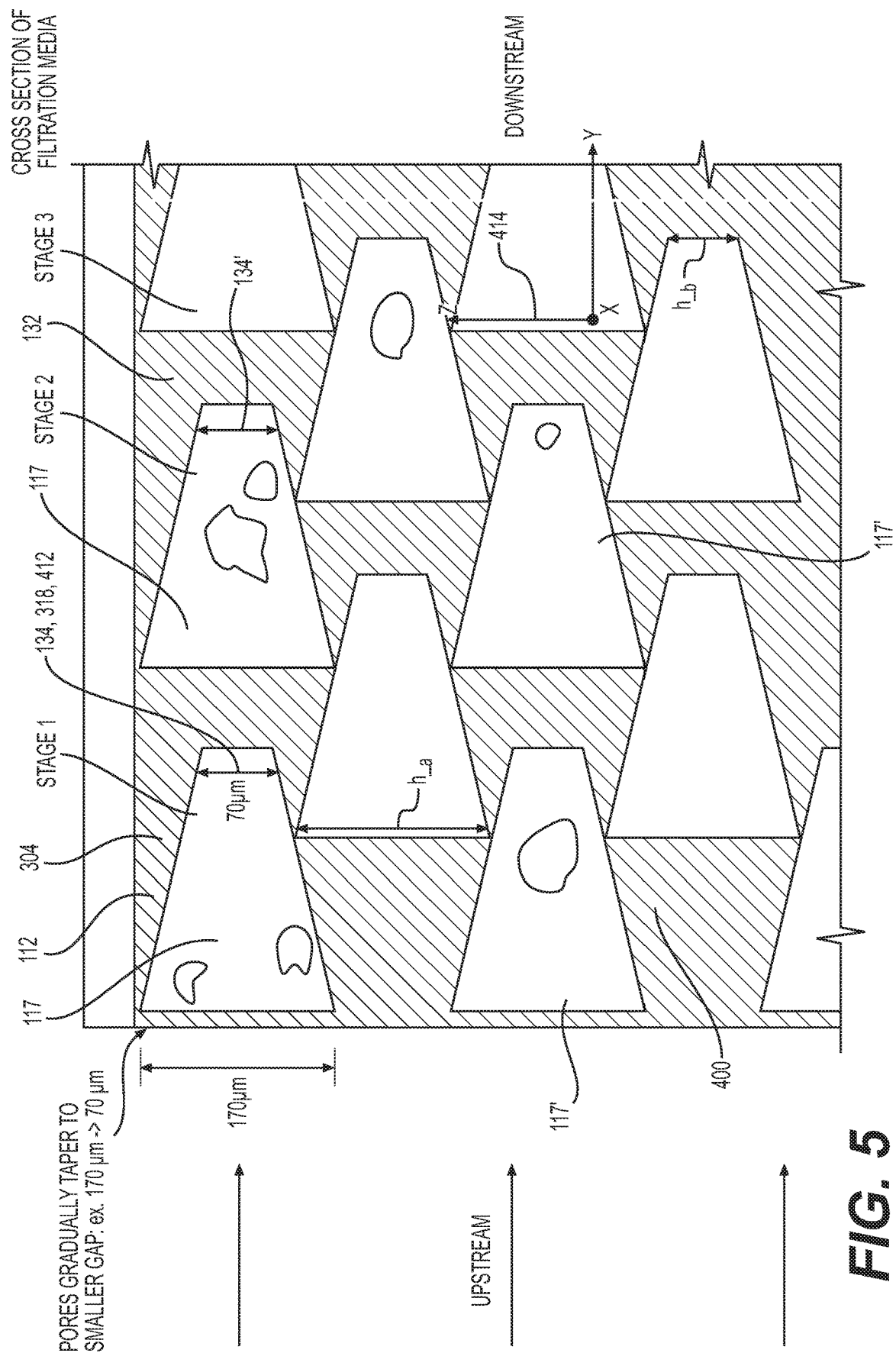
FIG. 5 is a sectional view of a filter medium according to another embodiment of the present disclosure.

The body 102 may be seamless and the first filter medium 112 may be an integral part of the body 102 or may be a separate component from the body 102, being inserted later into the body 102. As best seen in FIG. 5, the first filter medium 112 may define a plurality of pores 117 that define a minimum dimension 134 that is between 50 μm to 200 μm. In particular embodiments, the minimum dimension 134 of the plurality of pores 117 may range from 70 μm to 170 μm. These various configurations, spatial relationships, and dimensions may be varied as needed or desired to be different than what has been specifically shown and described in other embodiments. For example, the pore size may be as big as desired or may be as small as desired (e.g. 4 μmicrons, in FIG. 5 h_a>>h_b).

Looking at FIGS. 2 and 4, the filter 100 may further comprise a second filter medium 132 disposed immediately adjacent the first filter medium 112 and the outlet 110. That is to say, the fluid to be filtered flows through the inlet 108, through the first filter medium 112, then through the second filter medium 132, and then out through the outlet 110. In some embodiments, as best understood with reference to FIG. 5, the first filter medium 112 defines a plurality of pores 117, 117' having a first minimum dimension 134 and the second filter medium 132 defines a plurality of pores 117, 117' having a second minimum dimension 134'. The first minimum dimension 134 may be greater than the second minimum dimension 134'.

As a result, a plurality of filtering stages may be provided, so that larger sized contaminants are filtered out in the first stage by the first filter medium 112, finer contaminants are filtered out in the second stage by the second filter medium 132, etc. As many filtering states as needed or desired may be provided in various embodiments (up to and including the $n^{th}$ stage). In other embodiments, the first filter medium 112 may be configured to remove water, the second filter medium 134 may be configured to remove debris, etc. In some embodiments, the first filter medium 112 and the second filter medium 132 are separate components that may be inserted into the body 102. In such a case, the body 102 of the filter 100 is separate from the first filter medium 112 and the second filter medium 132. In other embodiments, the first filter medium 112 and the second filter medium 132 are integral with the body 102 and each other, being built up at the same time as the body 102 via an additive manufacturing process.

Focusing now on FIGS. 6 thru 14, a filter 200 according to another embodiment of the present disclosure (e.g. a canister style filter) will be described. The filter 200 may comprise a housing 202 including an outer wall 204 and an inner wall 206. The outer wall 204 and the inner wall 206 define the same longitudinal axis 208. The inner wall 206 may have a cylindrical configuration and may define a radial direction 210 that passes through the longitudinal axis 208 and that is perpendicular thereto, and a circumferential direction 212 that is tangential to the radial direction 210 and perpendicular to the longitudinal axis 208. The inner wall 206 is spaced radially away from the outer wall 204, the housing 202 further defining a first end 214 and a second end 216 disposed along the longitudinal axis 208 and a hollow interior 218. These various configurations and spatial relationships may differ in other embodiments.

As best seen in FIGS. 7 thru 10, an inlet 220 is in fluid communication with the hollow interior 218 and an outlet 222 is in fluid communication with the hollow interior 218. A filter medium 224 is disposed in the hollow interior 218 comprising a plurality of layers 226, 226', etc. Each layer 226 may include an undulating strip 228, 228', etc. of solidified material. The filter medium 224 includes an annular shape defining an outer annular region 230 and an inner annular region 232.

The hollow interior 218 includes an outer annular chamber 234 that is in fluid communication with the inlet 220 and the outer annular region 230 of the filter medium 224 and a central cylindrical void 237 concentric about the longitudinal axis 208 that is in fluid communication with the outlet 222 and the inner annular region 232 of the filter medium 224. This establishes the flow of the fluid to be filtered shown by arrows 236 in FIGS. 6 and 7. This direction of flow may be reversed in other embodiments.

Figure 8:
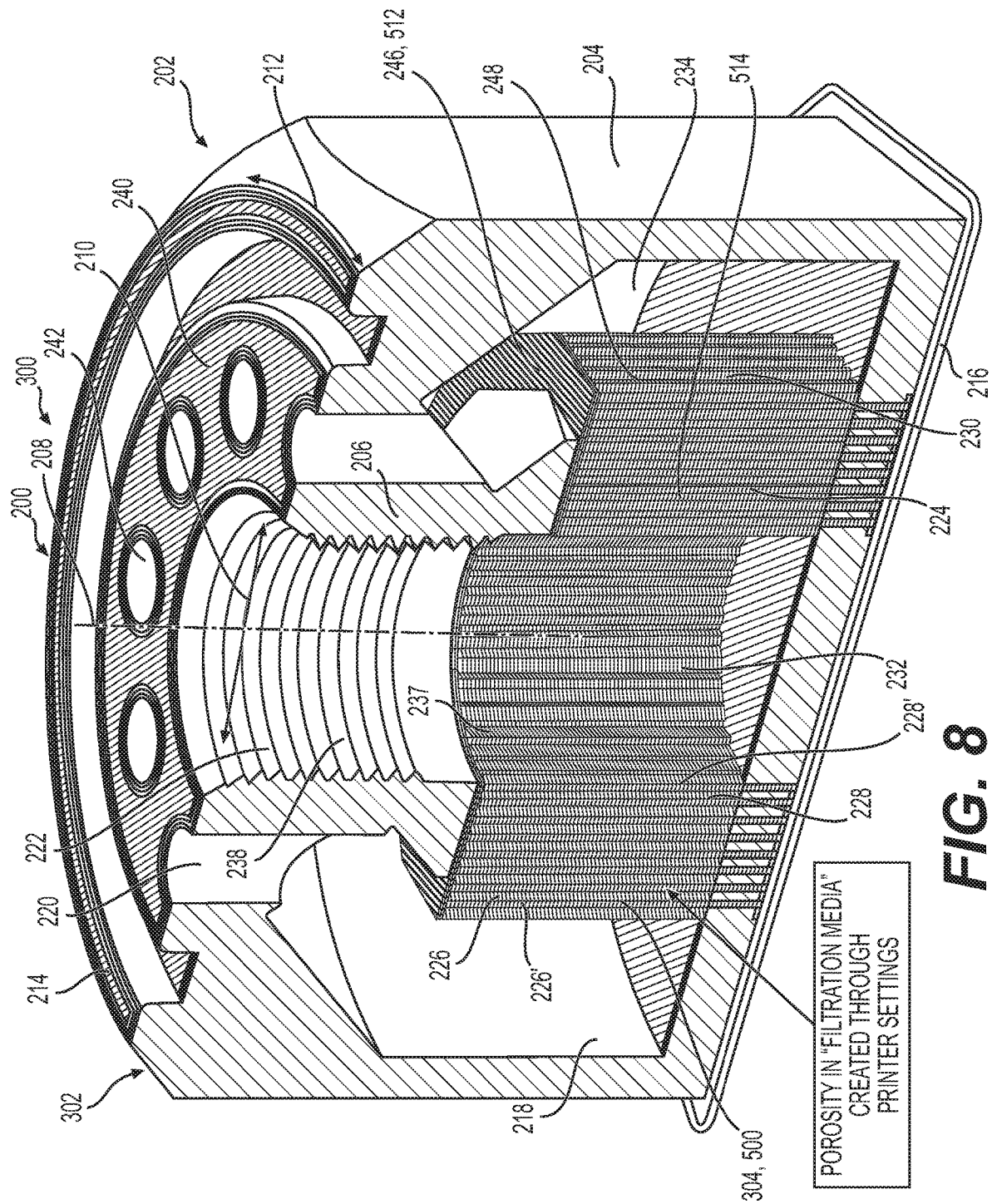
FIG. 8 shows the filter assembly of FIG. 7 in a dry state as it is being built using an additive manufacturing process, more clearly showing the porosity of the filter medium.
Figure 9:
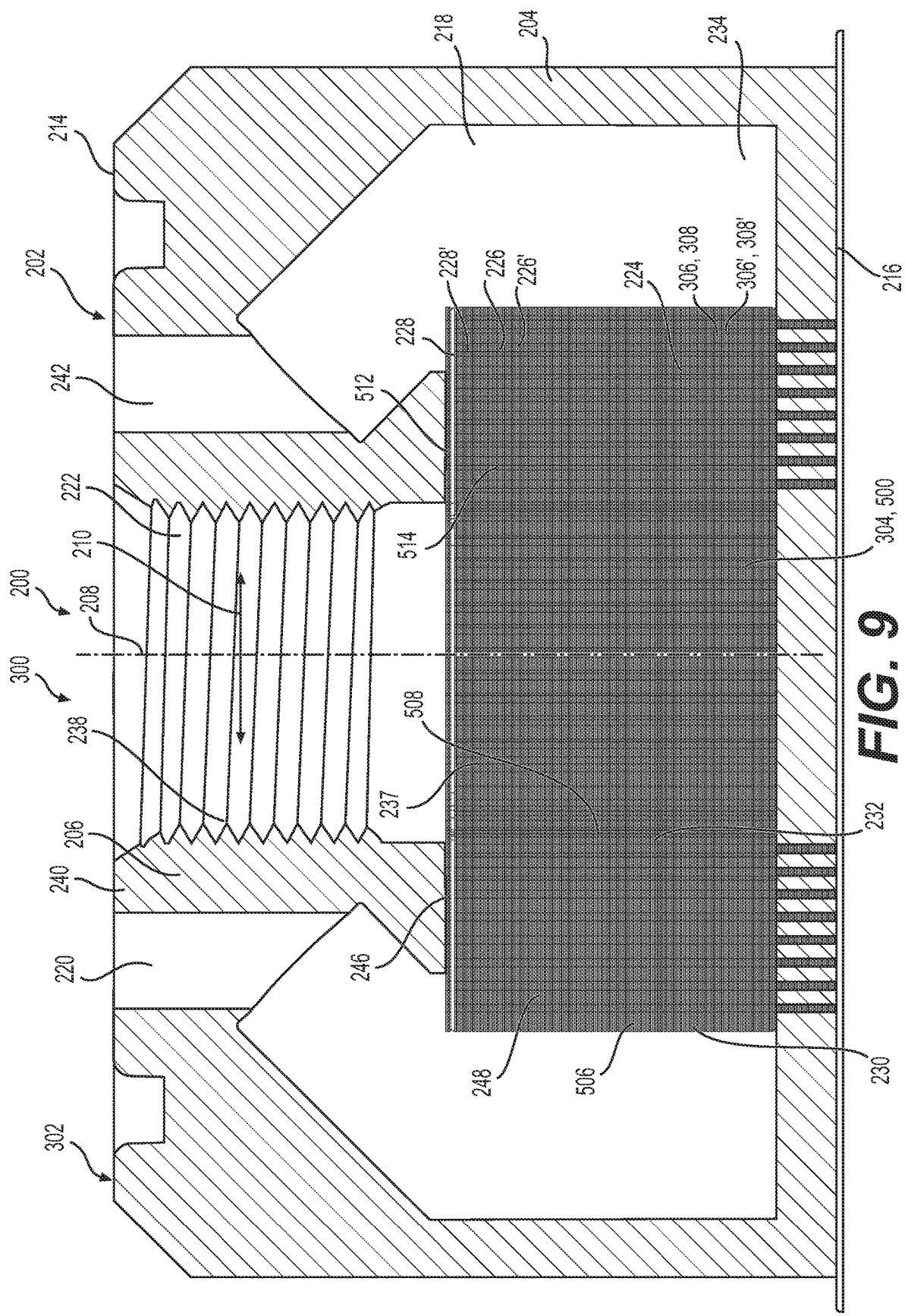
FIG. 9 shows a front sectional view of the filter assembly of FIG. 8.

The inner wall 206 may define the outlet 222 and may include internal threads 238 or other types of mating interfaces. The housing 202 defines a top surface 240 and the inlet 220 is a first cylindrical hole 242 extending from the top surface 240 to outer annular chamber 234 and the outlet 222 extends from the top surface 240 to the central cylindrical void 237. As shown in FIGS. 7 thru 9, a plurality of identically configured inlets 220 may be provided, arranged in a circular array about the longitudinal axis 208. Similarly, a plurality of outlets may be provided in various embodiments. The number and placement of the inlets and outlets may be varied as needed or desired in various embodiments.

In some embodiments, the housing 202 is seamless and the filter medium 224 is integral with the housing 202. For example, the filter medium 224 may be built at the same time as the housing 202 via an additive manufacturing process. In other embodiments, the filter medium 224 may be a separate component inserted into the housing. A plurality of different filter media may be provided in a concentric manner as described earlier herein to provide multi-staged filtering if desired. The filter medium 224 defines a plurality of pores 117 (not clearly shown in FIGS. 7 thru 14 but is to be understood to have the same structure shown in FIG. 3 or 5) that define a minimum dimension 134 that is less than 200 μm. As previously mentioned herein, the size of the pores may be any suitable size.

Focusing on FIGS. 8 thru 12, the filter medium 224 comprises a cap portion and a bottom portion. The cap portion 246 including a first plurality of layers 250, 250' etc. of solidified material including a first layer 250 with a first undulating strip 252 of solidified material extending in the first predetermined direction 254 and a second layer 250' with a second undulating strip 252' of solidified material extending in a second predetermined direction 256. The first layer 250 is in contact with the second layer 250' and the first predetermined direction 254 is not parallel with the second predetermined direction 256.

Similarly, the bottom portion 248 includes a second plurality of layers 258, 258' of solidified material including a third layer 258 with a third undulating strip 260 of solidified material extending in the third predetermined direction 262 and a fourth layer 258' with a fourth undulating strip 260' of solidified material extending in a fourth predetermined direction 264. The third layer 258 is in contact with the fourth layer 258' and the third predetermined direction 262 is not parallel with the fourth predetermined direction 264.

Figure 10:
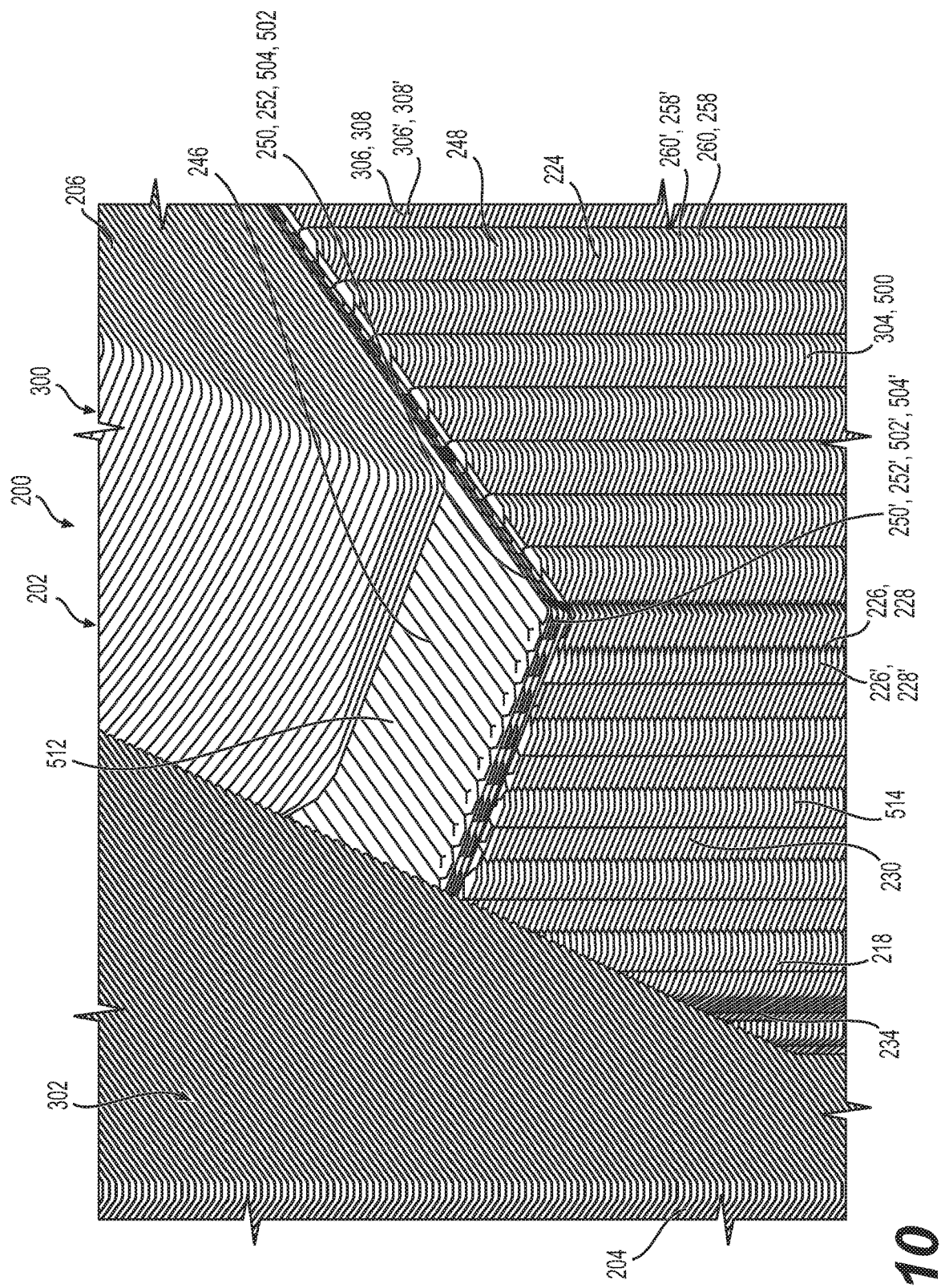
FIG. 10 is enlarged detail view of a portion of the filter assembly of FIG. 8, illustrating that the housing and the filter medium may both be made using additive manufacturing.
Figure 11:
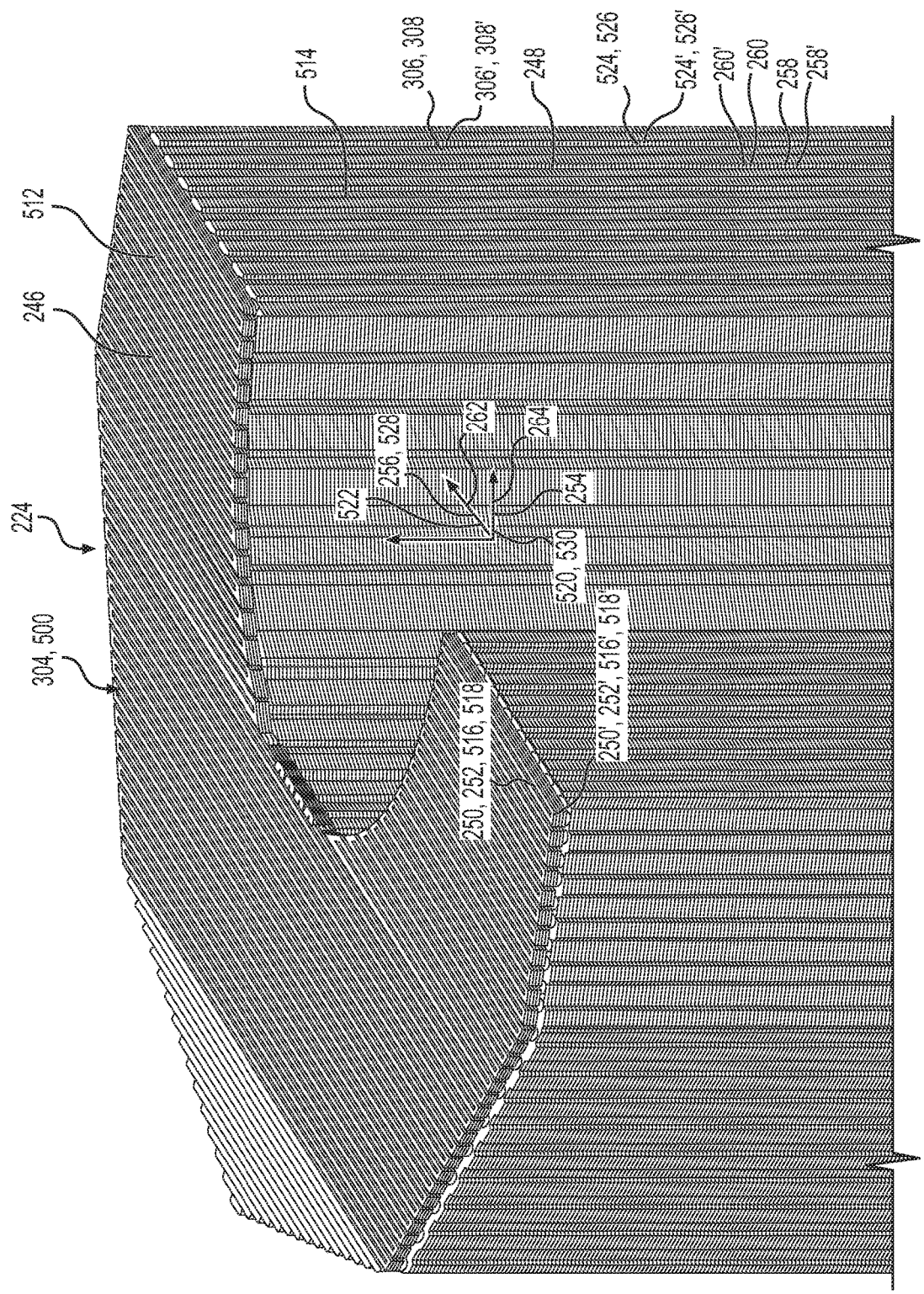
FIG. 11 is a perspective sectional view of the filter medium of FIG. 8, showing more clearly that the filter medium has a generally cylindrical annular configuration.
Figure 12:
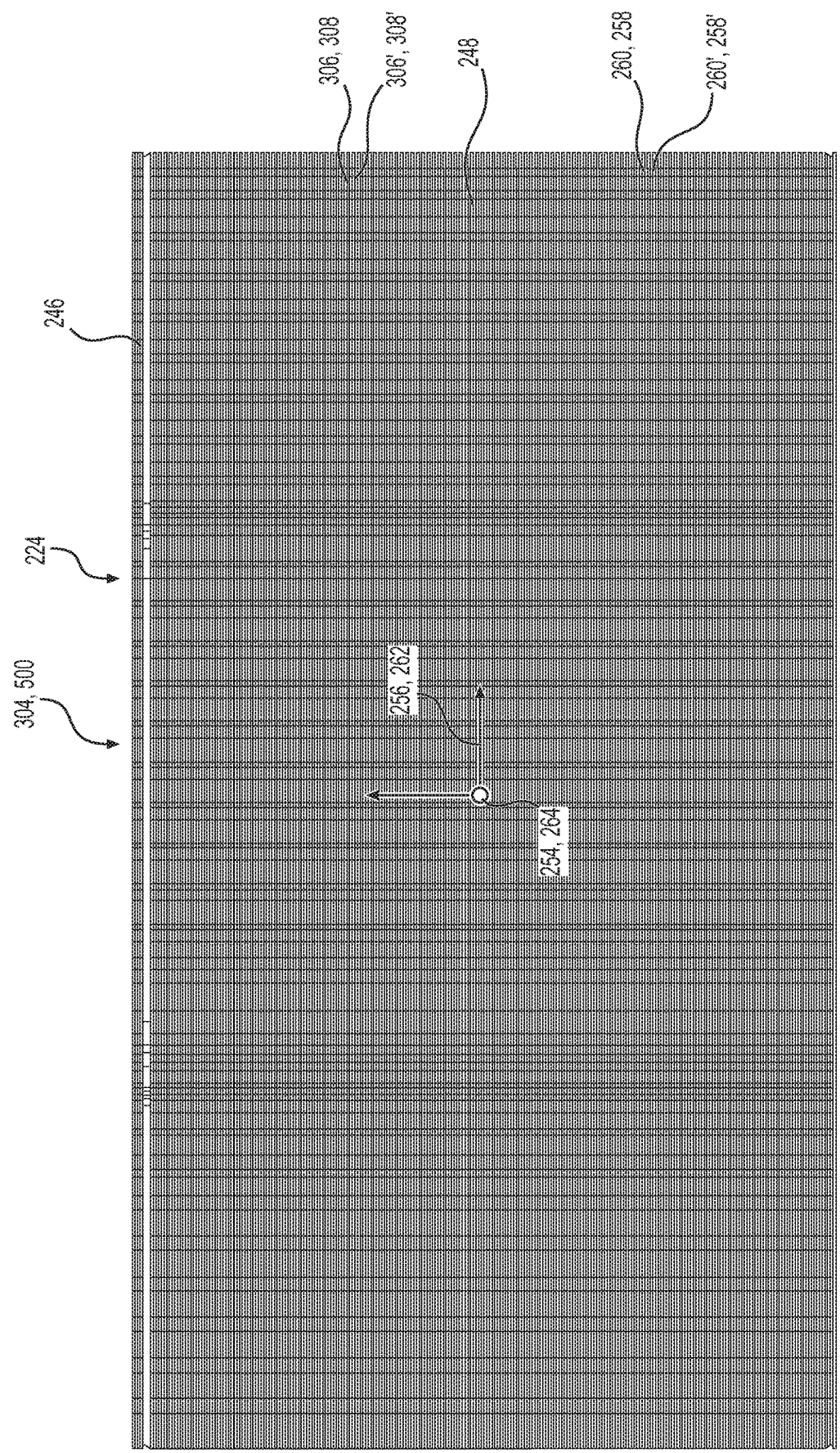
FIG. 12 is a front view of the filter medium of FIG. 11.
Figure 13:
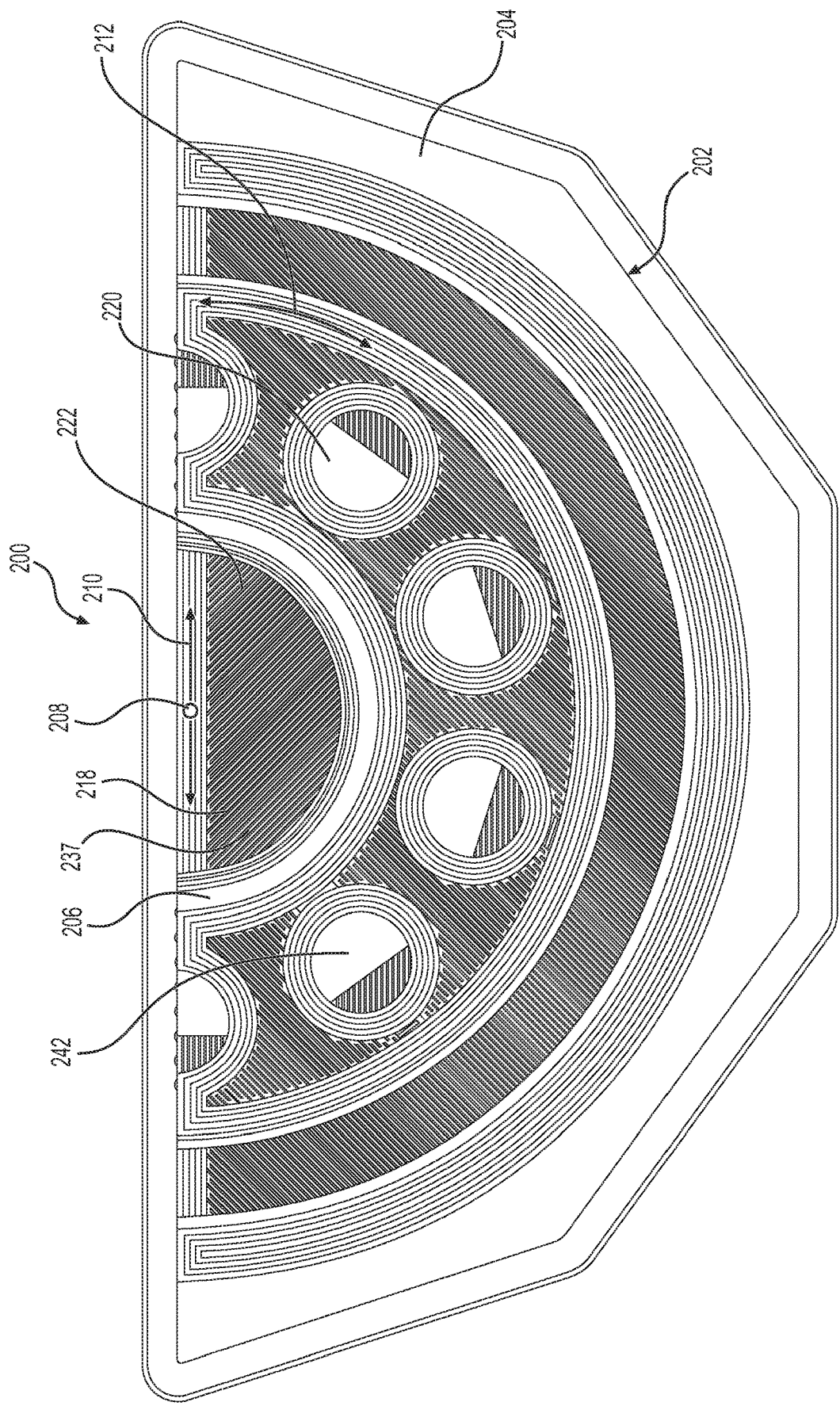
FIG. 13 is a top sectional view of the filter assembly of FIG. 8.

As best seen in FIG. 10, the undulations of the cap portion 246 and the undulations of the bottom portion 248 are out of phase with each other. The cap portion 246 and the bottom portion 248 may represent the first 3-5 layers of a print. The number of solid layers at the bottom and at the top are controlled by the print settings. They may provide additional structural support to the print and seal off the "infill" from the layers of exposed plastic. In some embodiments, multiple media may be stacked vertically to create "out of phase" undulations that can manipulate and change the flow paths of the fluids running through each section of the out of phase media packs. For example, more restrictive channels may be provided at the top or bottom portions while the middle portion may have more open channels depending on the preferences for a particular filtration application.

Figure 14:
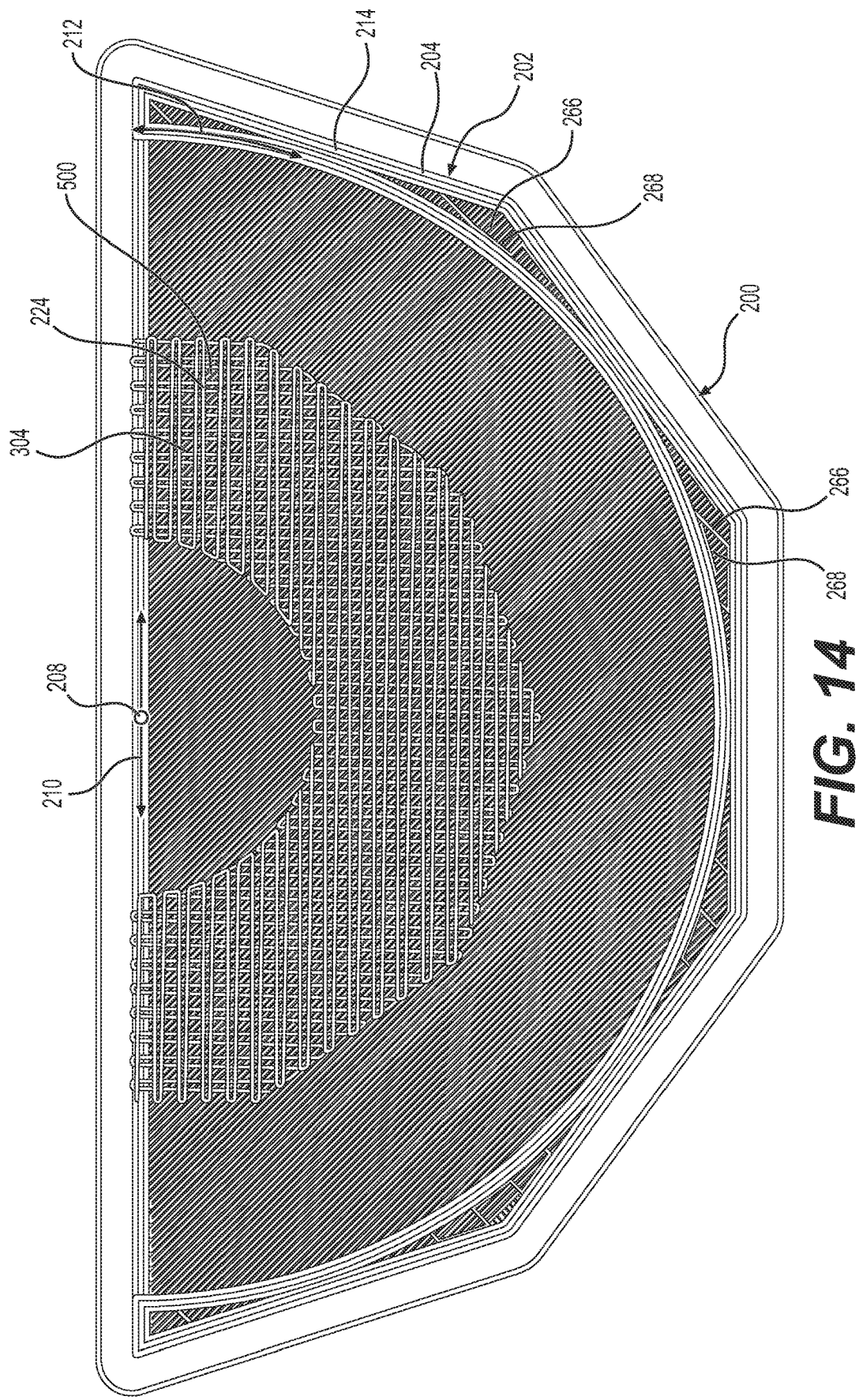
FIG. 14 is a top sectional view of the filter assembly of FIG. 8

FIG. 14 shows that the filter 200 may include auxiliary voids 266 with support structure 268 disposed therein to speed up the manufacturing process when using an additive manufacturing process while maintaining the structural integrity of the filter 200.

A filter 300 according to yet another embodiment of the present disclosure may be generally described as follows with reference to FIGS. 1 thru 14. The filter 300 may comprise a housing 302 and a filter medium 304 including a plurality of layers 306, 306', etc. of solidified material. At least one of the plurality of layers 306, 306' of solidified material includes an undulating strip 308 of solidified material extending in a first predetermined direction 310. Looking at FIG. 3, the undulating strip 308 of material may be arranged in a trapezoidal pattern. That is to say, two legs 312 of the strip 308 may be angled relative to each other (or oblique relative to each other) to form a pore 314 with a reduced size as the fluid passes through the pore 314. In FIG. 3, this reduction in size occurs in the X-Y plane. In FIG. 5, this reduction also occurs in the Y-Z plane. Put another way, the trapezoidal pattern at least partially defines a plurality of pores 314, 314', each of the plurality of pores 314, 314' including a pore dimension 318 that decreases in size along the second predetermined direction 316.

Focusing on FIG. 3, the plurality of layers 306, 306' etc. of solidified material includes a first layer 306 with a first undulating strip 308 of solidified material extending in the first predetermined direction 310 and a second layer 308' with a second undulating strip 308' of solidified material extending in a second predetermined direction 316. The undulations of any strip of solid material for any embodiment described herein may have any suitable shape including zig-zag, square (or rectangular), trapezoidal, sinusoidal, polynomial, etc.

The first layer 306 is in contact with the second layer 306' (that is to say the legs of one layer may contact the layers of the other layer) and the first predetermined direction 310 is not parallel with the second predetermined direction 316. This arrangement helps to form the pores 314, 314'. The first predetermined direction 310 may be perpendicular to the second predetermined direction 316. As shown in FIG. 3, the first undulating strip 308 of solidified material is arranged in a trapezoidal pattern and the second undulating strip 308' of solidified material is arranged in a square pattern (legs 312' are parallel to each other). Another shape such as trapezoidal could also be used for strip 308'. Any of these shapes may be varied as needed or desired in other embodiments.

A filter medium 400 according to an embodiment of the present disclosure will now be described with reference to FIGS. 3 and 5 that may be used as a replacement part. It should also be noted that various embodiments of a filter medium as described herein may be reused by backflushing captured debris or other contaminants from the filter medium. The filter medium 400 may comprise a plurality of layers 402, 402', etc. of solidified material including a first layer 402 with a first undulating strip 404 of solidified material extending in a first predetermined direction 406, and a second layer 402' with a second undulating strip 404' of solidified material extending in a second predetermined direction 408. The first layer 402 is in contact with the second layer 402' and the first predetermined direction 406 is not parallel with the second predetermined direction 408, forming a plurality of pores 410, 410' therebetween.

In particular embodiments, the first predetermined direction 406 is perpendicular to the second predetermined direction 408 but not necessarily so. The first undulating strip 404 of solidified material has a trapezoidal pattern and the second undulating strip 404' of solidified material has a square pattern. Other shapes are possible.

As alluded to earlier herein, the trapezoidal pattern at least partially defines a plurality of pores 410, 410', each including a pore dimension 412 that decreases in size along the second predetermined direction 408.

In FIG. 3, the filter medium 400 includes a rectangular cubic configuration. Other shapes such as annular are possible.

In FIG. 5, the filter medium 400 defines a third predetermined direction 414 and the pore dimension 412 decreases in size along the third predetermined direction 414. By way of an example, the first predetermined direction may by the X direction, the second direction may be the Y direction, and the third direction may be the Z direction.

Looking at FIGS. 7 thru 12, another embodiment of a filter medium 500 that may be provided as a replacement part can be described as follows. The filter medium 500 may comprise a plurality of layers 502, 502', etc., each including an undulating strip 504, 504' etc. of solidified material. The filter medium 500 may include an annular shape defining an outer annular region 506 and an inner annular region 508. The plurality of layers 502, 502', etc. contact each other define a plurality of pores 510 therebetween.

The filter medium 500 may further comprise a cap portion 512 and a bottom portion 514 with the attributes and options described earlier herein. The cap portion 512 may include a first plurality of layers 516, 516', etc. of solidified material including a first layer 516 with a first undulating strip 518 of solidified material extending in the first predetermined direction 520 and a second layer 516' with a second undulating strip 518' of solidified material extending in a second predetermined direction 522. The first layer 516 is in contact with the second layer 516' and the first predetermined direction 520 is not parallel with the second predetermined direction 522.

The bottom portion 514 includes a second plurality of layers 524, 524', etc. of solidified material including a third layer 524 with a third undulating strip 526 of solidified material extending in the third predetermined direction 528 and a fourth layer 524' with a fourth undulating strip 526' of solidified material extending in a fourth predetermined direction 530. The third layer 524 is in contact with the fourth layer 524' and the third predetermined direction 528 is not parallel with the fourth predetermined direction 530.

Again, as alluded to earlier herein, the undulations of the cap portion 512 and the undulations of the bottom portion 514 are out of phase with each other. As alluded to earlier herein, the "out of phase" undulations may provide an opportunity to have different porosity and filtering in different directions and sections of the media.

Any of the dimensions or configurations discussed herein for any embodiment of a filter medium or filter or associated features may be varied as needed or desired. Also, the filter medium or filter may be made from any suitable material that has the desired structural strength and that is chemically compatible with the fluid to be filtered. For example, various plastics may be used including, but not limited to PLA, co-polyesters, ABS, PE, Nylon, PU, etc.

INDUSTRIAL APPLICABILITY

In practice, a filter medium, or a filter according to any embodiment described herein may be sold, bought, manufactured or otherwise obtained in an OEM or after-market context.

Figure 15:
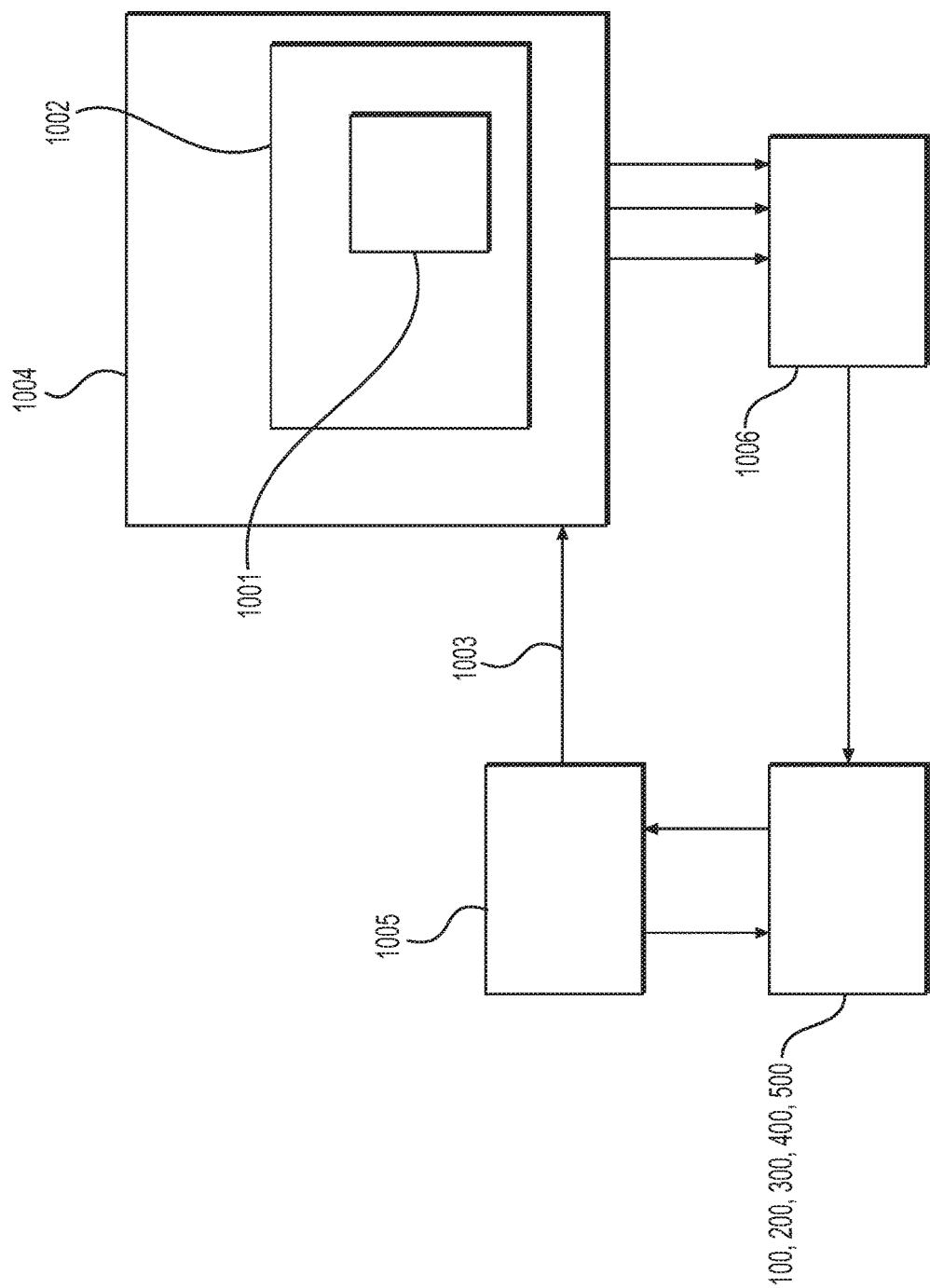
FIG. 15 is a schematic depicting a method and representing a system for generating a three-dimensional model of the filter and/or filter medium according to any embodiment of the present disclosure.

With reference to FIGS. 15 and 16, the disclosed filter mediums and filters may be manufactured using conventional techniques such as, for example, casting or molding. Alternatively, the disclosed filter mediums and filters may be manufactured using other techniques generally referred to as additive manufacturing or additive fabrication.

Known additive manufacturing/fabrication processes include techniques such as, for example, 3D printing. 3D printing is a process wherein material may be deposited in successive layers under the control of a computer. The computer controls additive fabrication equipment to deposit the successive layers according to a three-dimensional model (e.g. a digital file such as an AMF or STL file) that is configured to be converted into a plurality of slices, for example substantially two-dimensional slices, that each define a cross-sectional layer of the filter or filter medium in order to manufacture, or fabricate, the filter or filter medium. In one case, the disclosed filter or filter medium would be an original component and the 3D printing process would be utilized to manufacture the filter or filter medium. In other cases, the 3D process could be used to replicate an existing filter or filter medium and the replicated filter or filter medium could be sold as aftermarket parts. These replicated aftermarket filters or filter mediums could be either exact copies of the original filter or filter mediums or pseudo copies differing in only non-critical aspects.

With reference to FIG. 15, the three-dimensional model 1001 used to represent a filter 100, 200, 300 or a filter medium 400, 500 according to any embodiment disclosed herein may be on a computer-readable storage medium 1002 such as, for example, magnetic storage including floppy disk, hard disk, or magnetic tape; semiconductor storage such as solid state disk (SSD) or flash memory; optical disc storage; magneto-optical disc storage; or any other type of physical memory or non-transitory medium on which information or data readable by at least one processor may be stored. This storage medium may be used in connection with commercially available 3D printers 1006 to manufacture, or fabricate, the filter 100, 200, 300 or the filter medium 400, 500. Alternatively, the three-dimensional model may be transmitted electronically to the 3D printer 1006 in a streaming fashion without being permanently stored at the location of the 3D printer 1006. In either case, the three-dimensional model constitutes a digital representation of the filter 100, 200, 300 or the filter medium 400, 500 suitable for use in manufacturing the filter 100, 200, 300 or the filter medium 400, 500.

The three-dimensional model may be formed in a number of known ways. In general, the three-dimensional model is created by inputting data 1003 representing the filter 100, 200, 300 or the filter medium 400, 500 to a computer or a processor 1004 such as a cloud-based software operating system. The data may then be used as a three-dimensional model representing the physical the filter 100, 200, 300 or filter medium 400, 500. The three-dimensional model is intended to be suitable for the purposes of manufacturing the filter 100, 200, 300 or filter medium 400, 500. In an exemplary embodiment, the three-dimensional model is suitable for the purpose of manufacturing the filter 100, 200, 300 or filter medium 400, 500 by an additive manufacturing technique.

In one embodiment depicted in FIG. 15, the inputting of data may be achieved with a 3D scanner 1005. The method may involve contacting the filter 100, 200, 300 or the filter medium 400, 500 via a contacting and data receiving device and receiving data from the contacting in order to generate the three-dimensional model. For example, 3D scanner 1005 may be a contact-type scanner. The scanned data may be imported into a 3D modeling software program to prepare a digital data set. In one embodiment, the contacting may occur via direct physical contact using a coordinate measuring machine that measures the physical structure of the filter 100, 200, 300 or filter medium 400, 500 by contacting a probe with the surfaces of the filter 100, 200, 300 or the filter medium 400, 500 in order to generate a three-dimensional model.

In other embodiments, the 3D scanner 1005 may be a non-contact type scanner and the method may include directing projected energy (e.g. light or ultrasonic) onto the filter 100, 200, 300 or the filter medium 400, 500 to be replicated and receiving the reflected energy. From this reflected energy, a computer would generate a computer-readable three-dimensional model for use in manufacturing the filter 100, 200, 300 or the filter medium 400, 500. In various embodiments, multiple 2D images can be used to create a three-dimensional model. For example, 2D slices of a 3D object can be combined to create the three-dimensional model. In lieu of a 3D scanner, the inputting of data may be done using computer-aided design (CAD) software. In this case, the three-dimensional model may be formed by generating a virtual 3D model of the disclosed filter 100, 200, 300 or the filter medium 400, 500 using the CAD software. A three-dimensional model would be generated from the CAD virtual 3D model in order to manufacture the filter 100, 200, 300 or the filter medium 400, 500.

The additive manufacturing process utilized to create the disclosed the filter 100, 200, 300 or the filter medium 400, 500 may involve materials such as described earlier herein. In some embodiments, additional processes may be performed to create a finished product. Such additional processes may include, for example, one or more of cleaning, hardening, heat treatment, material removal, and polishing such as when metal materials are employed. Other processes necessary to complete a finished product may be performed in addition to or in lieu of these identified processes.

Focusing on FIG. 16, the method 600 for manufacturing a filter or filter medium according to any embodiment disclosed herein may comprise providing a computer-readable three-dimensional model of the filter or the filter medium, the three-dimensional model being configured to be converted into a plurality of slices that each define a cross-sectional layer of the filter or filter medium (block 602); and successively forming each layer of the filter or filter medium by additive manufacturing (block 604). Successively forming each layer of the filter or filter medium by additive manufacturing may include building a plurality of layers, wherein at least one of the plurality of layers includes a first undulating strip of material extending in a first predetermined direction (block 606).

Also, the method may comprise forming a second one of the plurality of layers including a second undulating strip of material extending in a second predetermined direction that is different than the first predetermined direction (block 608). Furthermore, the method may comprise varying at least one of the following variables to create the desired pore minimum dimension: the speed and/or path of the print head, the flow rate of the plastic, the type of plastic, rate of cooling of the plastic, and the pattern or the configuration of the undulating material to create layer deformation (block 610). The filter or filter medium may be built from the bottom toward the top.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A filter medium comprising:
a plurality of layers of solidified material including
a first layer with a first undulating strip of solidified material extending in a first predetermined direction in a first plane parallel to the first predetermined direction; and
a second layer with a second undulating strip of solidified material extending in a second predetermined direction in a second plane parallel to the second predetermined direction;
wherein the first layer is in contact with the second layer and the first predetermined direction is not parallel with the second predetermined direction, forming a plurality of pores therebetween, the first predetermined direction is perpendicular to the second predetermined direction, and the first undulating strip of solidified material has a trapezoidal pattern including two non-parallel legs and the second undulating strip of solidified material has a square pattern including two parallel legs.

2. The filter medium of claim 1 wherein the trapezoidal pattern at least partially defines a plurality of pores each including a pore dimension that decreases in size along the second predetermined direction.

3. The filter medium of claim 1 wherein the filter medium includes a rectangular cubic configuration.

4. The filter medium of claim 2 wherein the filter medium defines a third predetermined direction and the pore dimension decreases in size along the third predetermined direction.

5. A filter comprising:
a body including an outer wall defining a hollow interior;
an inlet in fluid communication with the hollow interior,
an outlet in fluid communication with the hollow interior; and
a first filter medium disposed in the hollow interior comprising a plurality of layers, wherein each layer includes an undulating strip of solidified material, forming a plurality of pores between each of the plurality of layers, and a least one of the plurality of layers includes an undulating strip of solidified material that has a trapezoidal pattern including two oblique legs, and another one of the plurality of layers includes a rectangular pattern including two parallel legs that contact the two oblique legs of the trapezoidal pattern;

wherein the hollow interior includes a rectangular cubic chamber in fluid communication with the inlet and the outlet and the first filter medium is disposed in the rectangular cubic chamber between the inlet and the outlet, and configured such that fluid passes through the inlet, then through the first filter medium, and then through the outlet, the body includes a bottom wall and a sidewall, and the inlet extends through the bottom wall and the outlet extends through the sidewall.

6. The filter of claim 5 wherein the body defines a plurality of parallel support ribs disposed in the outlet.

7. The filter of claim 5 wherein the body further defines a plurality of auxiliary voids that are not in fluid communication with the rectangular cubic chamber.

8. The filter of claim 7 wherein the body includes support structure disposed in the plurality of auxiliary voids.

9. The filter of claim 5 wherein the body is seamless and the first filter medium defines a plurality of pores that define a minimum dimension that is between 50 μm to 200 μm.

10. The filter of claim 9 wherein the minimum dimension of the plurality of pores ranges from 70 μm to 170 μm.

11. The filter of claim 5 further comprising a second filter medium disposed immediately adjacent the first filter medium and the outlet, wherein first filter medium defines a plurality of pores having a first minimum dimension, the second filter medium defines a plurality of pores having a second minimum dimension, and the first minimum dimension is greater than the second minimum dimension.

12. The filter of claim 11 wherein the first filter medium and the second filter medium are separate components.

13. The filter of claim 12 wherein the body of the filter is separate from the first filter medium and the second filter medium.

\* \* \* \* \*